United States Patent
Eberle et al.

(10) Patent No.: US 7,352,741 B2
(45) Date of Patent: Apr. 1, 2008

(54) METHOD AND APPARATUS FOR SPECULATIVE ARBITRATION

(75) Inventors: Hans Eberle, Mountain View, CA (US); Nils Gura, Santa Clara, CA (US); Nicolas Fugier, Saint Martin d'Heres (FR); Bernard Tourancheau, Saint Ismier (FR)

(73) Assignee: Sun Microsystems, Inc., Santa Clara, CA (US)

(*) Notice: Subject to any disclaimer, the term of this patent is extended or adjusted under 35 U.S.C. 154(b) by 1072 days.

(21) Appl. No.: 10/080,135

(22) Filed: Feb. 21, 2002

(65) Prior Publication Data

US 2003/0156597 A1 Aug. 21, 2003

(51) Int. Cl.
*H04L 12/28* (2006.01)
*G06F 13/14* (2006.01)
*H04L 12/403* (2006.01)

(52) U.S. Cl. .................. 370/389; 370/429; 370/447; 370/461; 710/240

(58) Field of Classification Search ............... None
See application file for complete search history.

(56) References Cited

U.S. PATENT DOCUMENTS

| | | | |
|---|---|---|---|
| 3,676,846 A | 7/1972 | Busch | |
| 4,648,029 A | 3/1987 | Cooper et al. | |
| 4,654,654 A | 3/1987 | Butler et al. | |
| 4,674,082 A | 6/1987 | Flanagin et al. | |
| 4,760,521 A | 7/1988 | Rehwald et al. | |
| 4,792,944 A | 12/1988 | Takahashi et al. | |
| 4,984,237 A | 1/1991 | Franaszek | |
| 5,042,032 A | 8/1991 | Dighe et al. | |
| 5,195,089 A * | 3/1993 | Sindhu et al. | 370/235 |
| 5,218,602 A | 6/1993 | Grant et al. | |
| 5,267,235 A * | 11/1993 | Thacker | 370/396 |
| 5,301,279 A | 4/1994 | Riley et al. | |
| 5,359,320 A | 10/1994 | Jaffe et al. | |
| 5,367,643 A | 11/1994 | Chang et al. | |
| 5,467,211 A | 11/1995 | Haney et al. | |
| 5,500,858 A | 3/1996 | McKeown | |
| 5,517,495 A | 5/1996 | Lund et al. | |
| 5,539,747 A | 7/1996 | Ito et al. | |
| 5,544,163 A | 8/1996 | Madonna | |

(Continued)

FOREIGN PATENT DOCUMENTS

| | | |
|---|---|---|
| EP | 0 463 943 A2 | 1/1992 |
| EP | 0 507 044 A3 | 10/1992 |
| EP | 0 868 054 A2 | 9/1998 |
| EP | 0 869 651 A1 | 10/1998 |
| EP | 1 096 387 A1 | 5/2001 |
| WO | WO 98/19439 | 5/1998 |

(Continued)

OTHER PUBLICATIONS

Maltz, D.A. et al., "MSOCKS: An Architecture for Transport Layer Mobility", ISBN: 0-7803-4384-0, vol. 3, Mar. 29, 1998, pp. 1037-1045.

(Continued)

*Primary Examiner*—Huy D. Vu
*Assistant Examiner*—Clemence Han
(74) *Attorney, Agent, or Firm*—Osha · Liang LLP

(57) ABSTRACT

An arbiter is used so multiple users can use shared resources. The arbiter allocates at least one of the resources speculatively to one of the users for use during a particular access interval in the absence of a request for the resource from the user. The arbiter can also allocate one or more of the resources for use during the particular access interval in response to requests received by the arbiter for the resource(s). That is, a particular access interval may include both speculative and non-speculative allocation of resources by the arbiter.

41 Claims, 7 Drawing Sheets

U.S. PATENT DOCUMENTS

| | | | |
|---|---|---|---|
| 5,550,815 | A | 8/1996 | Cloonan et al. |
| 5,560,016 | A | 9/1996 | Fiebrich et al. |
| 5,564,062 | A | 10/1996 | Meaney et al. |
| 5,566,171 | A | 10/1996 | Levinson |
| 5,566,182 | A | 10/1996 | Gantner et al. |
| 5,577,035 | A | 11/1996 | Hayter et al. |
| 5,617,575 | A | 4/1997 | Sakakibara et al. |
| 5,664,121 | A * | 9/1997 | Cerauskis ............... 710/113 |
| 5,684,961 | A | 11/1997 | Cidon et al. |
| 5,742,594 | A | 4/1998 | Natarajan |
| 5,771,229 | A | 6/1998 | Gavrilovich |
| 5,790,545 | A | 8/1998 | Holt et al. |
| 5,790,546 | A * | 8/1998 | Dobbins et al. ............ 370/400 |
| 5,821,875 | A | 10/1998 | Lee et al. |
| 5,835,491 | A | 11/1998 | Davis et al. |
| 5,838,681 | A | 11/1998 | Bonomi et al. |
| 5,884,046 | A | 3/1999 | Antonov |
| 5,954,799 | A | 9/1999 | Goheen et al. |
| 5,956,342 | A * | 9/1999 | Manning et al. ............ 370/414 |
| 6,009,092 | A | 12/1999 | Basilico |
| 6,023,732 | A | 2/2000 | Moh et al. |
| 6,029,217 | A | 2/2000 | Arimilli et al. |
| 6,034,954 | A | 3/2000 | Takase et al. |
| 6,067,300 | A | 5/2000 | Baumert et al. |
| 6,069,573 | A | 5/2000 | Clark, II et al. |
| 6,072,772 | A | 6/2000 | Charny et al. |
| 6,111,886 | A | 8/2000 | Stewart |
| 6,115,373 | A | 9/2000 | Lea |
| 6,122,274 | A | 9/2000 | Kumar |
| 6,141,329 | A | 10/2000 | Turner |
| 6,160,812 | A | 12/2000 | Bauman et al. |
| 6,161,160 | A | 12/2000 | Niu et al. |
| 6,188,686 | B1 | 2/2001 | Smith |
| 6,198,749 | B1 | 3/2001 | Hui et al. |
| 6,208,653 | B1 | 3/2001 | Ogawa et al. |
| 6,212,194 | B1 | 4/2001 | Hsieh |
| 6,304,578 | B1 | 10/2001 | Fluss |
| 6,327,175 | B1 | 12/2001 | Manapat et al. |
| 6,336,156 | B1 | 1/2002 | Chiang |
| 6,345,050 | B1 | 2/2002 | Alleyne et al. |
| 6,370,148 | B1 | 4/2002 | Calvignac et al. |
| 6,404,756 | B1 | 6/2002 | Whitehill et al. |
| 6,449,283 | B1 | 9/2002 | Chao et al. |
| 6,473,103 | B1 | 10/2002 | Bailey et al. |
| 6,487,213 | B1 | 11/2002 | Chao |
| 6,501,734 | B1 * | 12/2002 | Yu et al. .................. 370/236 |
| 6,535,941 | B1 * | 3/2003 | Kruse ...................... 710/241 |
| 6,549,938 | B1 | 4/2003 | Kilkki et al. |
| 6,553,027 | B1 | 4/2003 | Lam et al. |
| 6,567,428 | B1 | 5/2003 | Rubin et al. |
| 6,570,873 | B1 | 5/2003 | Isoyama et al. |
| 6,580,720 | B1 | 6/2003 | Francis et al. |
| 6,667,955 | B1 | 12/2003 | Blanc et al. |
| 6,728,243 | B1 | 4/2004 | Jason, Jr. et al. |
| 6,771,596 | B1 | 8/2004 | Angle et al. |
| 6,816,947 | B1 * | 11/2004 | Huffman .................. 711/151 |
| 2002/0129181 | A1 * | 9/2002 | Lahiri et al. ............... 710/113 |
| 2003/0110318 | A1 * | 6/2003 | Providenza ............... 710/1 |

FOREIGN PATENT DOCUMENTS

| | | |
|---|---|---|
| WO | WO 99/26381 | 5/1999 |
| WO | WO 00/29956 | 5/2000 |

OTHER PUBLICATIONS

Watson, R. W. et al., "The Parallel I/O Architecture of the High-Performance Storage System (HPSS)", Fourteenth IEEE Symposium on Mass Storage Systems, Sep. 11, 1995, pp. 27-44.

Gruber, R. and Dubois-Pelerin Y., "Swiss-Tx: first experiences on the T0 system", EPFL-SCR No. 10 (http://www.grid-computing.net/documents/articlel.pdf), Nov. 1998, 6 pages.

Brauss, S., "Communication Libraries for the Swiss-Tx Machines", EPFL-SCR No. 11 (http://www.grid-computing.net/documents/article3.pdf), Nov. 1999, 6 pages.

Working Draft, T11.1/Project 1245-D/Rev 1.9, "Information Technology—Scheduled Transfer Protocol (ST)", May 28, 1998, pp. 1-85.

Tamir and Chi, "Symmetric Crossbar Arbiters for VLSI Communication Switches", IEEE Transactions on Parallel and Distributed Systems, vol. 4, No. 1, 1993, pp. 13-27.

Boden, Cohen et al., "Myrinet: A Gigabit-per-Second Local Area Network", IEEE Feb. 1995, pp. 29-36.

Kronenberg, Levy, et al., "VAXclusters: A Closely-Coupled Distributed System", ACM Transactions on Computer Systems, vol. 4, No. 2, May 1986, pp. 130-146.

Dally, William J., "Virtual-Channel Flow Control", IEEE 1990, pp. 60-68.

Chun, Mainwaring et al., "Virtual Network Transport Protocols for Myrinet", Computer Science Division University of California at Berkeley, Aug. 20, 1997, pp. 1-14.

Pakin, Karamcheti et al., "Fast Messages: Efficient, Portable Communication for Workstation Clusters and MPPs", IEEE Concurrency, Apr.-Jun., 1997, pp. 60-73.

Karol, Hluchyj et al., "Input Versus Output Queueing on a Space-Division Packet Switch", IEEE Transactions on Communications, vol. COM-35, No. 12, Dec. 1987, pp. 1347-1356.

Scott and Thorson, "The Cray T3E Network: Adaptive Routing in a High Performance 3D Torus", HOT Interconnects IV, Stanford University, Aug. 15-16, 1996, pp. 1-10.

Mainwaring and Culler, "Design Challenges of Virtual Networks: Fast, General-Purpose Communication", ACM SIGPLAN Symposium on Principles and Practice of Parallel Programming (PPOPP), Atlanta, GA, May 4-6, 1999.

Chun, Mainwaring et al., "Virtual Network Transport Protocols for Myrinet", IEEE Micro, vol. 18, No. 1, 1998, pp. 52-63.

Scott, Steven L., "Synchronization and Communication in the T3E Multiprocessor", Cray Research, Inc., 1996, pp. 26-36.

Mainwaring and Culler, "Active Message Applications Programming Interface and Communication Subsystem Organization", Draft Technical Report, Computer Science Division University of California at Berkeley, Technical Report UCB CSD-96-918, Oct. 1996, pp. 1-45.

Sun Microsystems, Inc., "The Sun Enterprise Cluster Architecture Technical White Paper", 1997, pp. 1-74.

IBM, "JES2 Introduction", Document No. GC28-1794-02, Third Edition, 1997, pp. 1-51.

ANSI, "Information Technology—Scheduled Transfer Protocol (ST)", T11.1/Project 1245-D/Rev. 3.6, Jan. 31, 2000, pp. 1-97.

Martin Collier and Tommy Curran, "Cell-Level Path Allocation in a Three-Stage ATM Switch," Communications, 1994, iCC 94, SUPERCOMM/ICC '94, Conference Record, Conference on Serving Humanity Through Communications, IEEE International, vol. 2, May 1-5, 1994, pp. 1179-1183.

Martin Collier and Tommy Curran, "Path Allocation in a Three-Stage Broadband Switch with Intermediate Channel Grouping," INFOCOM '93, Proceedings Twelfth Annual Joint Conference of the IEEE Computer and Communications Societies, Networking: Foundation for the Future, IEEE, vol. 3, Mar. 28-Apr. 1, 1993, pp. 927-934.

Eng,Kai Y., Hluchyj, Michael G., and Yeh, Yu-Shuan, "A Knockout Switch for Variable-Length Packets," IEEE Journal on Selected Areas In Communications, vol. SAC-5, No. 9, Dec. 1987, pp. 1426-1435.

Gruber, R. and Sawley, M-C "Swiss-Tx, un projet d'entrepeneurs", EPFL Flash Informatique (EPFL-FI Online)! (http://sic.epfl.ch/SA/publications/FI98/fi-6-98/fi-6-98.pdf), Jul. 1998, 6 pages.

* cited by examiner

ARBITRATION CYCLE 1

|      | RES1 | RES2 | RES3 |
|------|------|------|------|
| REQ1 | (1)  | 1    | ∅    |
| REQ2 | 1    | ∅    | 1    |
| REQ3 | ∅    | ∅    | (1)  |

◯ GRANTED REQUEST

ARBITRATION CYCLE 2

|      | RES1 | RES2 | RES3 |
|------|------|------|------|
| REQ1 | (1)  | ∅    | ∅    |
| REQ2 | ∅    | ∅    | ∅    |
| REQ3 | ∅    | ∅    | [∅]  |

☐ SPECULATIVELY GRANTED REQUEST

FIG. 7

METHOD AND APPARATUS FOR SPECULATIVE ARBITRATION

CROSS-REFERENCE TO RELATED APPLICATION(S)

BACKGROUND

1. Field of the Invention

This invention relates to sharing of resources and more particularly to more efficient allocation of resources.

2. Description of the Related Art

Arbitration is needed if a shared resource is simultaneously requested by several users of that resource and access to the resource can only be granted to one user at a time. FIG. 1 shows a 2×2 crossbar switch coupling two input ports IP1 and IP2 with two output ports OP1 and OP2. In the example of FIG. 1, arbitration is required to allocate the output ports OP1 and OP2 to the input ports IP1 and IP2 since the input ports can simultaneously request the same output port and an output port can be utilized for a data transfer only by one input port at a time.

FIG. 2 shows exemplary timing of an arbitrated access to a shared resource such as may occur when IP1 and IP2 both request use of the same output port for the same time period. As is typical in arbitrated system, access to the resource is granted in fixed discrete time intervals 201 and 203. Arbitration (ARB1 and ARB2) typically also occurs in fixed discrete intervals 205 and 207. Fixed discrete intervals are typically used for arbitration and access intervals to make coordination with other system resources simpler. Note that arbitration overlaps access in the example shown in FIG. 2. For example, arbitration period 207 (ARB2) for access interval 203 (ACC2) overlaps access period 201 (ACC1). In the simple example of FIG. 2, there are two users issuing requests REQA and REQB for one shared resource. Requests REQA and REQB are considered during arbitration period ARB1 and request REQA is granted use of the shared resource during access period ACC1. REQB is again considered during arbitration period ARB2 and REQB is granted access to the shared resource during access period ACC2.

Unfortunately, there is unwanted delay between the time a request is generated (e.g. at 209) and the time the actual access begins. Assuming requests are generated at arbitrary times during an access interval and further assuming that there are no conflicts for the requested resource, the average delay is half the access interval plus the arbitration time. In the worst case, the delay can be the full interval plus the arbitration time.

Referring to FIG. 3, the worst case delay, given the assumptions above, is shown for request REQB, which misses arbitration cycle ARB2 and as a result has to wait to be considered in arbitration cycle ARB3. Note also that as a result, access interval ACC2 is not granted to anyone and therefore the resource goes unutilized during that access interval. Request REQB is subsequently granted the resource for use during access interval ACC3. The delay encountered by request REQB is unwanted since the delay increases the latency of the data, causes underutilization of the resource and can reduce throughput.

It would be desirable to provide an arbiter that more efficiently shares the available resources among the various users that request their use.

SUMMARY

Accordingly, the invention provides a method for sharing resources among multiple users of those resources using an arbiter. The arbiter speculatively allocates one or more of the shared resources to allow more efficient utilization of those resources. In one embodiment, the arbiter allocates one of the resources speculatively to one of the users for use during a particular access interval in the absence of a request for the resource from the user that is speculatively allocated the resource. The method may further include allocating at least a second of the resources for use during the particular access interval according to a request received by the arbiter for the other resource. That is, a particular access interval may include both speculative and non-speculative allocations. The arbiter may speculatively allocate multiple resources to respective users or may speculatively allocate multiple resources to a single user.

Any of a variety of approaches can be used to determine which of the users is speculatively allocated a resource. For instance, the arbiter may speculatively allocate a resource to a user because the user was granted a request for use of the resource during a previous arbitration cycle. Alternatively, the arbiter may speculatively allocate a resource because the user requested the resource during a previous arbitration cycle.

In another embodiment the invention provides an apparatus that includes a plurality of resources and a plurality of users of those resources. The users contend for use of the resources. Arbitration logic is coupled to receive requests from the users for use of the resources. The arbitration logic speculatively allocates a resource to one of the users for use during an access interval, absent a request from the one user for the at least one resource. The arbitration logic may further allocate at least another of the resources for use during the access interval according to a request received by the arbitration logic for the other resource. The arbiter can utilize a variety of approaches to determine which of the users is speculatively allocated which resource. For example, the arbitration logic may speculatively allocate the at least one resource when the user to whom the resource is being speculatively granted has been granted a request for use of the resource during a previous arbitration cycle.

In at least one embodiment, the invention provides an arbiter coupled to supply control information for use of resources. The arbiter is coupled to received request from users for use of rescouces during a particular access interval. The arbiter is responsive to a first group of request received prior to the start of a first arbitration cycle to determine allocation of the resources during the first arbitration cycle according to the first group of request and to receive at least a second plurality of requests after the start of the first arbitration cycle, and to determine additional allocation of the resources according to the second group of requests during a second arbitration cycle. The second arbitration cycle is shorter than the first arbitration cycle. The first and second arbitration cycles allocate resources for use during the particular access interval.

BRIEF DESCRIPTION OF THE DRAWINGS

The present invention may be better understood, and its numerous objects, features, and advantages made apparent to those skilled in the art by referencing the accompanying drawings.

FIG. 7 shows an exemplary schedule generated that includes a speculatively allocated resource.

The use of the same reference symbols in different drawings indicates similar or identical items.

DESCRIPTION OF THE PREFERRED EMBODIMENT(S)

Figure 1:
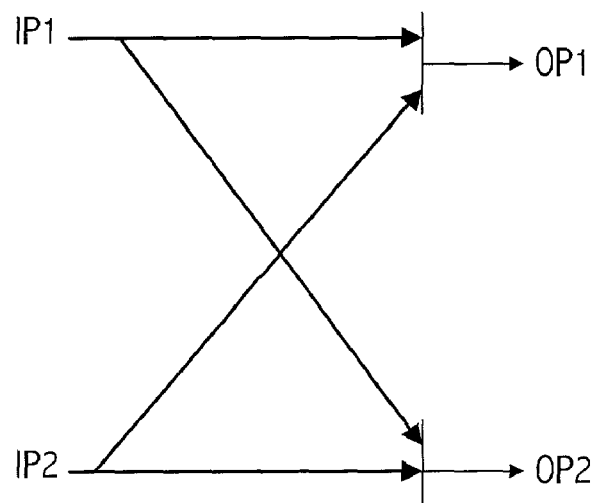
FIG. 1 shows a 2×2 switch.
Figure 2:
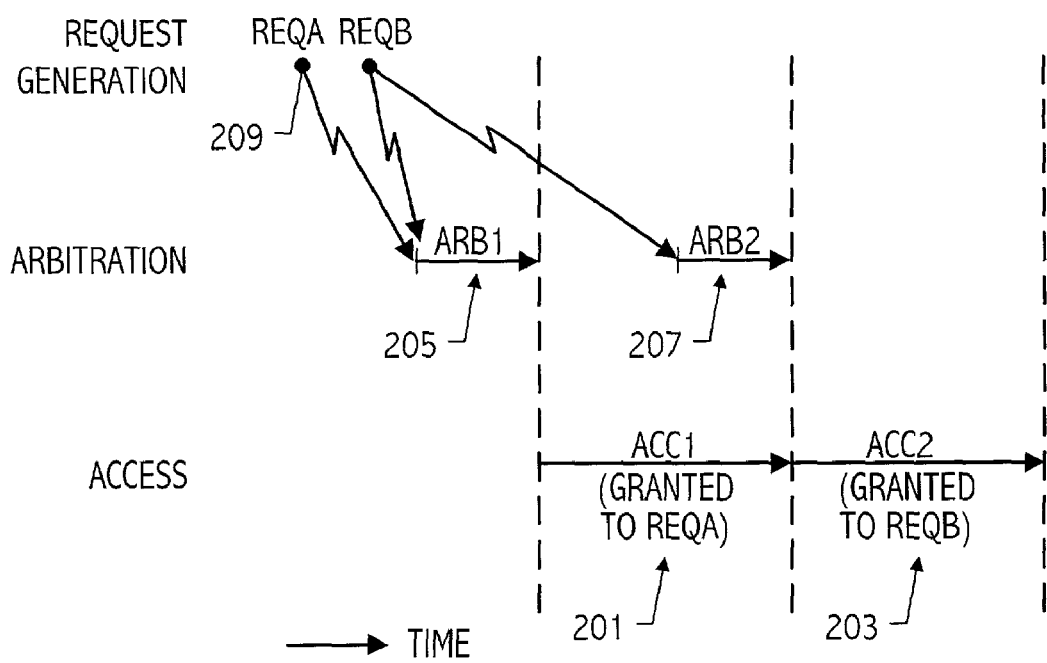
FIG. 2 shows an example of a typical arbitration sequence.
Figure 3:
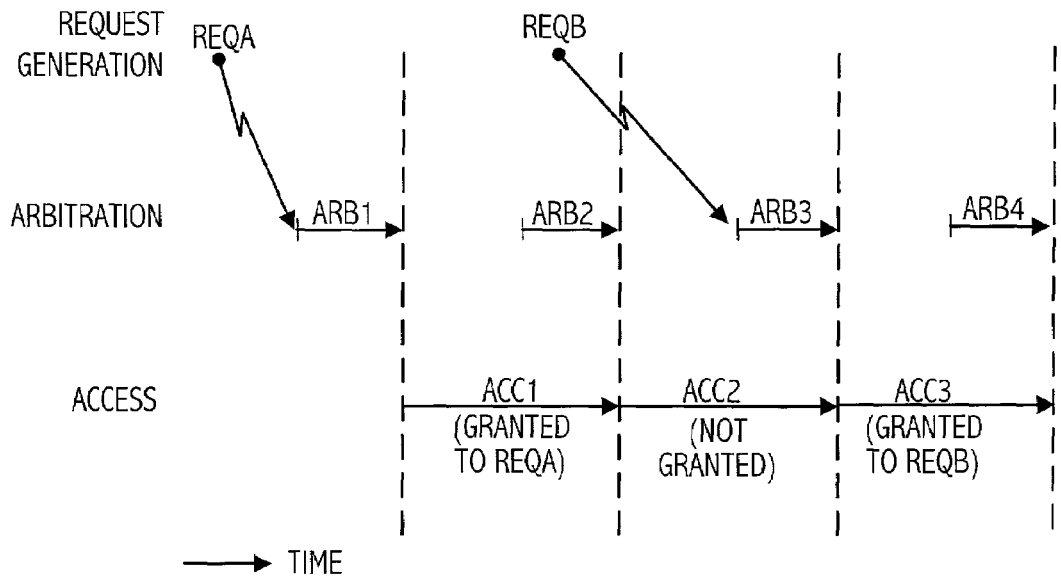
FIG. 3 shows an arbitration sequence in which access was delayed because the request came after the start of an arbitration cycle.
Figure 4:
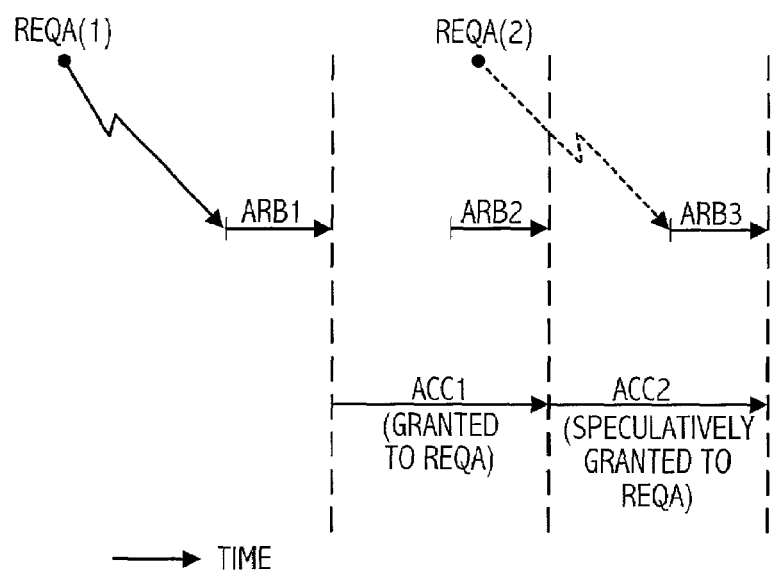
FIG. 4 shows an exemplary arbitration cycle in which a resource is speculatively granted.

Referring to FIG. 4, an example shows how an arbiter arbitrates requests conventionally and additionally speculatively assigns resources to users of the resources in the absence of requests for the resources. Since there is a delay between the generation of a request and the actual usage of the resource, speculative allocation of a resource to a user whose request occurs after the beginning of the arbitration cycle (or even after the beginning of the access interval as explained further herein) increases performance in respect to latency and throughput if requests that occur during the arbitration cycle can be processed in the immediately following usage (or access) interval.

FIG. 4 shows how speculative allocation of resources can improve throughput and reduce latency. In arbitration cycle ARB1, request REQA(1) is granted the usage interval ACC1. User A, who requested the resource in REQA(1), uses the granted resource during usage interval ACC1. No requests have been received by the arbiter by the start of arbitration cycle ARB2. However, even though no requests have been received, the arbiter grants usage interval ACC2 speculatively to user A. Another request from user A (REQA(2)) occurs after the start of arbitration cycle ARB2. Because the usage interval ACC2 has been speculatively granted to user A, the second request from user A, REQA(2), can be serviced during usage interval ACC2, rather than having to wait for the arbitration cycle ARB3, thereby allowing utilization of the resource one cycle earlier than a non-speculative arbiter approach would provide. In one embodiment, each arbitration cycle includes a "regular" portion in which resources are allocated in response to requests for those resources, and a "speculative" portion in which those resources unallocated in the regular portion may be speculatively allocated according to any of a number of approaches described further herein.

Figure 5:
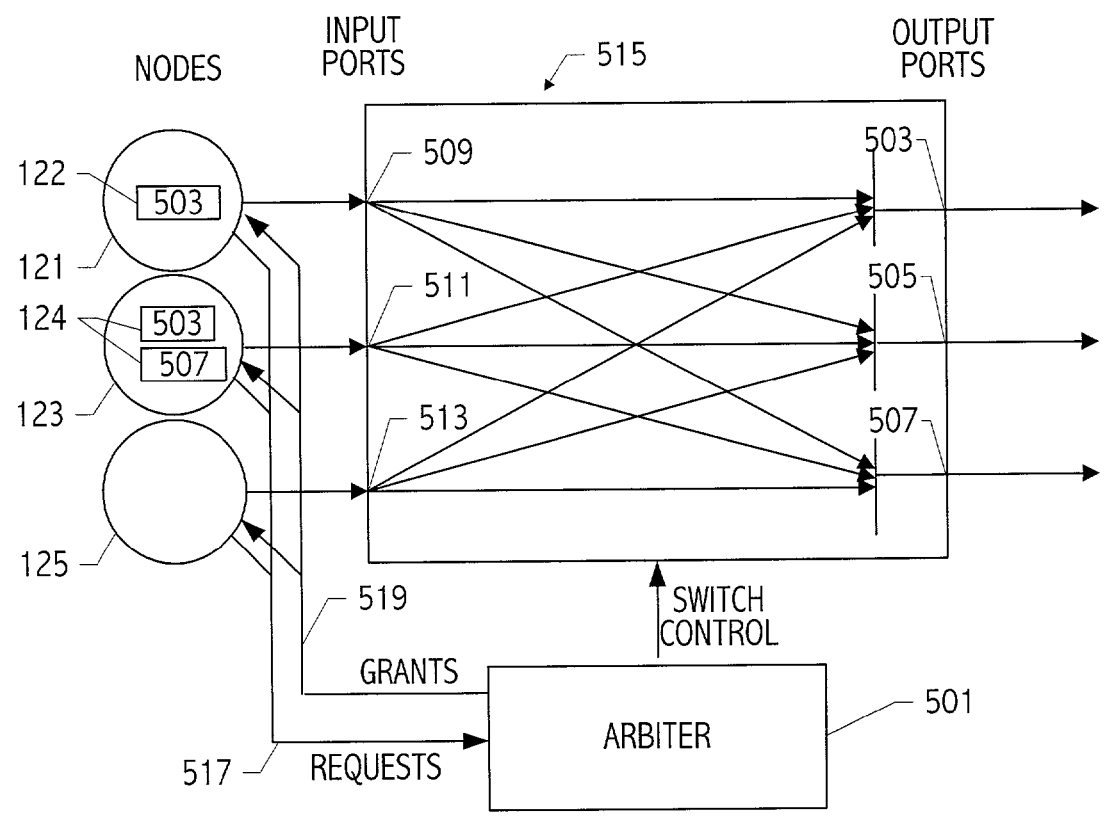
FIG. 5 shows an exemplary crossbar switch which can exploit one or more embodiments of the present invention.

Referring to FIG. 5, an embodiment of the invention is illustrated in which arbiter 501 schedules usage of shared resources, i.e., output ports 503, 505 and 507 among requesters, i.e. nodes 121, 123, and 125 connected to input ports, 509, 511 and 513, both in response to explicit requests and speculatively, that is, in the absence of a specific request from the user granted the resource. Crossbar switch 515 forwards packets from its input ports, 509, 511 and 513 to its output ports 503, 505 and 507. Each node can hold multiple packets destined for different output ports. In a typical arbiter, the switch schedule calculated connects input and output ports in such a way that as many packets as possible can be forwarded simultaneously, thus maximizing usage of shared resources. Each node sends a set of requests to arbiter 501, which then chooses the requests to be granted such that resources are allocated to requesters in a conflict-free way.

When no requests are received for a particular resource, i.e. an output port, during a particular usage interval in the switch, arbiter 501 speculatively grants the output port to one of the requesters, i.e. one of the nodes for the usage interval. In one embodiment of the invention, the arbiter operates in a synchronous manner in that the arbiter receives request signals 517 for shared resources at the same time from the various nodes 121, 123 and 125. Scheduling happens synchronously in that grant signals 519 are sent at the same time and the usage interval for each resource has the same length. Scheduling may be further constrained in that only one requester can use a particular resource at the same time. When developing an arbitration scheme the main goal typically is to achieve high aggregate usage of the resources while still providing a minimum level of fairness, mainly in the sense that starvation of individual requests is prevented.

In the example shown in FIG. 5, node 121 has a request 122 for the use of output port 503, and node 123 has a request 124 for output ports 503 and 507. Node 125 does not have any requests. A variety of approaches may be utilized for the arbitration scheme to allocate the output ports to the input ports. Examples of such arbitration schemes include fixed priority schemes, round robin schemes, and prioritizing requesters based on the number of their requests. Assume that under some arbitration scheme output port 503 is allocated to input port 509 (node 121) and output port 507 is allocated to input port 511 (node 123). Output port 505 is thus available to be speculatively allocated to input port 513 (node 125).

Figure 6:
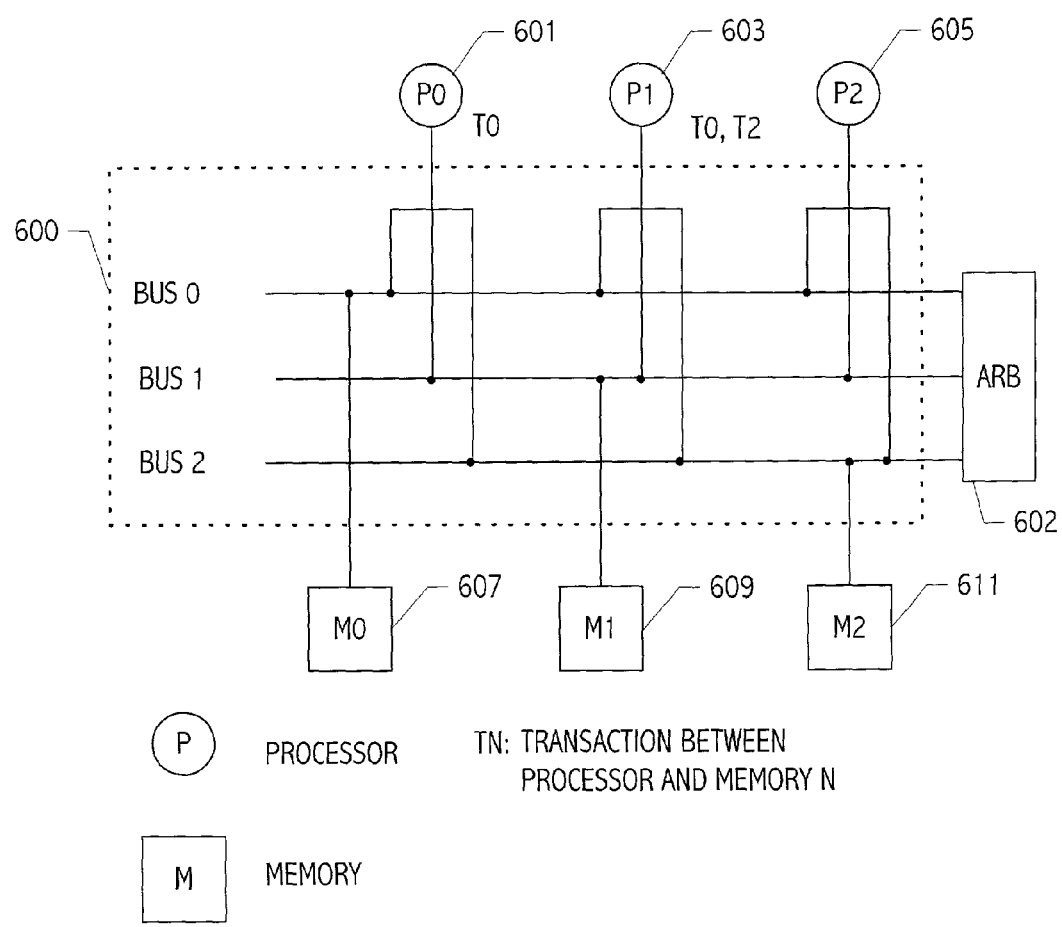
FIG. 6 shows a multi-processor system which can exploit one or more embodiments of the present invention.

Another example where a speculative arbitration scheme may be utilized is shown in FIG. 6, which is a multi-bus interconnection structure 600 functioning as a transport mechanism for connecting multiple processors 601, 603 and 605 (also referred to in FIG. 6 as P0, P1 and P2) with multiple memories 607, 609 and 611 (also referred to in FIG. 6 as M0, M1 and M2). Each processor can have multiple outstanding transactions such as read and write operations. Similar to the switch embodiment described in relation to FIG. 5, the bus schedule to be calculated connects processors and memories in a conflict-free way, ideally, such that at a given time as many transactions as possible can be executed in parallel.

The arbiter 602 may be coupled to each of the buses shown in FIG. 6. The request and grant lines may be incorporated into the buses as well or may be separately coupled to the arbiter 602. In fact, the arbiter, rather than being separate as shown, may in fact reside in one or more of the processors or memories, or be distributed among the processors and memories.

Assuming a central arbitration scheme utilizing arbiter 602, processor P0 requests transaction T0 for memory M0 from the arbiter, processor P1 requests transactions T0 and T2 for memories M0 and M2, respectively. Processor P2 has no current requests. Assume that the arbiter grants P0 usage of memory M0, and P1 usage of memory M2 for a particular usage interval. Since P2 has not been granted a resource and M1 is not being utilized the arbiter may speculatively grant the usage of M1 to P2.

While several examples have been given for systems which may exploit the speculative arbitration described herein, arbitration is used in many electronic and communication systems, and the speculative arbitration scheme described herein is generally applicable to those systems in which arbitration for resources by users is required.

While it has been assumed so far that a user accesses a resource from the beginning to the end of the usage interval, partial use of a usage interval by a user is also possible. For example, an input port of a switch in FIG. 5 may transfer data to a granted output port only during a portion of the interval. If a system can provide capability to partially use a resource during an access interval, that can be exploited by allowing a user request that arises after the start of an access interval to be serviced for a portion of that interval when the resource has been speculatively granted to the user with the late request. Thus more efficient use of resources can be provided if partial utilization capability is combined with speculative allocation.

FIG. 7 shows an example of schedules calculated by an arbiter using speculative arbitration. During arbitration cycle 1, the requester REQ1 is granted a request for resource RES1. Requester REQ2 is not granted any resources and requester REQ3 is granted resource RES3. During the next arbitration cycle 2 requester REQ1 is granted resource RES1 and requester REQ3 is speculatively allocated resource RES3 without having requested. In the example in FIG. 7, the arbiter speculatively allocates RES3 to REQ3 because of the grant of RES3 to REQ3 in the previous arbitration cycle, where REQ3 indicates a user that did not make a request for the resource.

There are many different ways that can be utilized to determine how to speculatively allocate resources to users. For example, a speculative grant may be based on a previous grant or previous request for the resource in the immediately preceding (or earlier) arbitration cycle. While in some embodiments, only some of the ungranted resources may be speculatively allocated based on previous requests or grants, in other embodiments an arbiter may allocate as many unused resources as possible.

In some circumstances, multiple users may have requested a resource during one or more previous arbitration cycles. Many different approaches can be utilized to determine which of the users should get the speculative grant. For example, referring again to FIG. 4, one simple approach is to grant access to the user who requested the resource in the immediately previous arbitration cycle or to the last user to utilize the resource if the resource was not utilized in the previous interval. Thus, in FIG. 4, since user A requested the resource in ARB1, user A is speculatively granted the resource in ARB2 even though no request has been received.

Other approaches are possible to select among multiple users. For example, users may be chosen utilizing a round-robin approach, or may be selected randomly (pseudo-randomly as usually implemented). Users may be selected according to a fixed priority scheme, or may be selected using an arbitration scheme in which the user with the fewest requests is granted the resource first. The arbiter may choose to allocate a resource speculatively to the user that has had the most requests for the resource during a predetermined number of previous arbitration cycles. The number of arbitration cycles utilized depends on the implementation of the arbiter and the application in which the arbiter is being used, and may vary from, e.g., two cycles, to tens or hundreds of arbitration cycles. In another embodiment, the arbiter may choose to allocate a resource speculatively to the user that has had the most grants for the resource during a predetermined number of previous arbitration cycles. The arbiter may choose to allocate a resource speculatively to the user that has had the most requests or most grants for all resources combined during a predetermined number of previous arbitration cycles.

The arbiter may chose choose to allocate a resource speculatively to the user that has had the highest fill-level for the send queue associated with the resource to be scheduled, the fill-level either being the current fill-level or the fill-level averaged over the last n arbitration cycles, where n is implementation and application dependent. For example, referring to FIG. 5, each node 121, 123 and 125 may have send queues associated with each of the output ports. The fill level for the particular queue can be sent to the arbiter 501 along with the request for each of the output ports.

The arbiter may choose to allocate a resource speculatively based on the fill-level of the receive queue associated with the resource to be scheduled, averaged over the last n arbitration cycles, where n is implementation and application dependent. For example, referring to FIG. 5, each node may have receive queues associated with one or more of the output ports. The arbiter may choose to allocate a resource if the fill level of the receive queue is high, which would imply that the resource has received a lot of data transfers and is likely to receive more. The fill level for the particular queue can be communicated to the arbiter 501 along with the request for each of the output ports, if each node 121, 123 and 125 is coupled both to an input port and an output port. If the nodes are not coupled to the output port, additional communication links, such as additional wires, can be provided to communicate fill levels. The particular choice of how to allocate resources based on fill level may be based on such factors as predicted resource utilization and other system characteristics.

The various approaches described above may be used to choose among all users or just among those users having requests during the previous one or more arbitration cycles, or just among those users having requests during the previous one or more arbitration cycles for the particular resource being speculatively allocated.

Many other approaches and combinations of the above described approaches can be utilized to determine how to allocate a resource to a user speculatively. Providing speculative allocation allows the resources such as output ports or memories to be more efficiently utilized by the users (e.g., nodes coupled to input ports and processors, respectively).

Figures 8, 9:
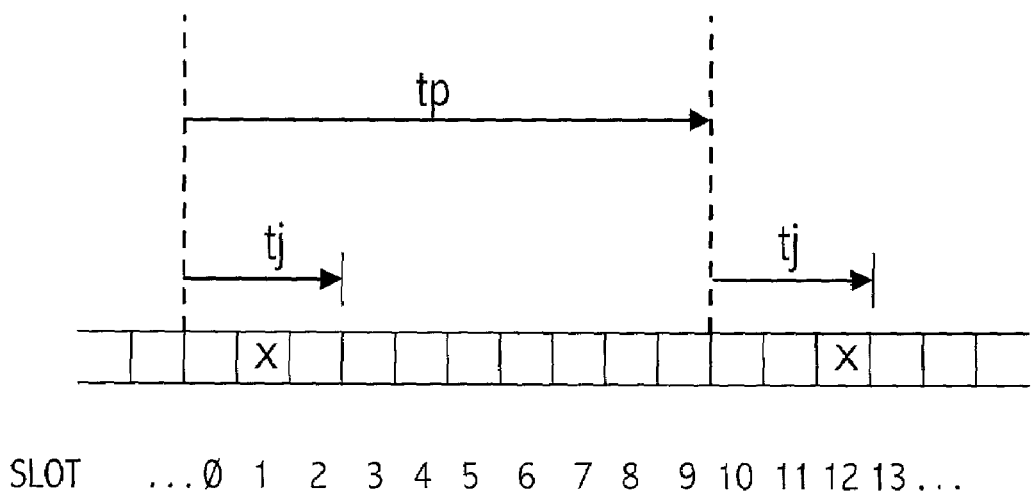
FIG. 8 shows a schedule generated that includes a speculatively allocated resource using a hint.
FIG. 9 shows an example of a speculatively allocated real time request.

The arbiter may receive a hint from the users saying whether they want to be speculatively granted a resource or not. Any of the above described arbitration schemes or combination thereof, may be utilized to select among the users indicating in their hints that they wish to be allocated resources (or a particular resource) speculatively. Referring again to FIG. 5, the hints may accompany the requests sent by the nodes to the arbiter 501. The hints may indicate for each arbitration cycle the resource(s) in which the user is interested. Alternatively, the nodes may indicate to the arbiter in e.g., during an initialization procedure, whether they wish to be considered for speculative allocation of resources generally or for specific resources. In addition to supplying the hint, the resources may also specify a set of resources they would be interested in being speculatively granted. The arbiter may also receive a hint from a resource as to whether it wished to be speculatively granted. Referring to FIG. 8, an example is given of a schedule generated by an arbiter using hints. During the first part of an arbitration cycle requester REQ1 is granted resource RES1 and requester REQ3 is granted resource RES3. During a second part of the arbitration cycle, requester REQ2, who had provided a hint indicating that it wants to be speculatively granted resource RES2, is speculatively granted resource RES2.

An arbiter may utilize speculative arbitration to more efficiently allocate unused resources to periodic real-time requests such as video data, which require servicing within a fixed period of time. Referring to FIG. 9, the real time requirements are specified by period tp and jitter tj. tj defines the size of the window during which any slot (usage interval) can be used to grant the real-time request. The user with the real time request may not notify the arbiter of the real-time request, speculating that the user will receive a speculative grant to fulfill the real-time request earlier than the deadline given by tp and tj. If there is not an unused slot, the last slot of the window will be allocated to the real-time request, thereby guaranteeing that the real-time request is serviced within its required period tp and jitter tj. In the example shown in FIG. 9, a request is granted in slot 1 and slot 12. The request is granted in slot 1 speculatively when the resource first becomes available in the jitter period. In slot 12 in contrast, the request is granted to meet the deadline given by tp and tj. This assumes that a real-time request does not conflict with any other real-time request and that real-time requests are given priority over non-real-time requests.

Note that while certain of the embodiments described herein may utilize fixed slots, the various embodiments described herein may also be used where variable sized slots are used.

Figure 10:
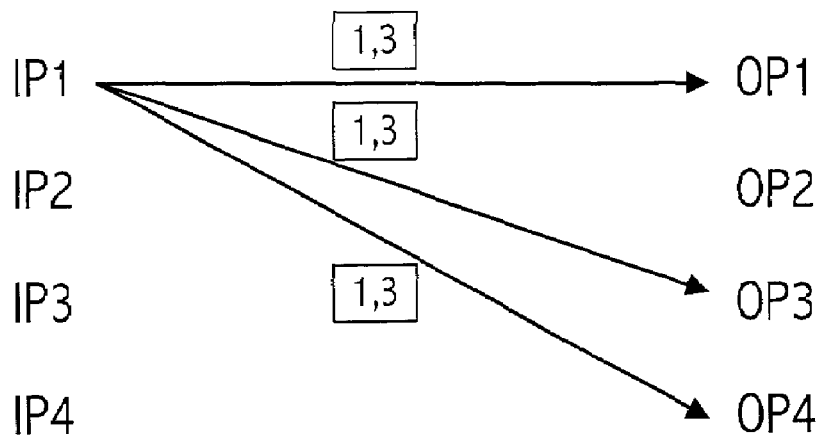
FIG. 10 shows an example of multiple resources allocated to a single user thereby allowing for speculatively allocated multicast operations.

A conventional arbiter typically coordinates grants such that a requester receives at most one grant. A speculative arbiter might decide to generate more than one grant per requester. That can be useful when applied to, e.g., network switches where multiple grants given to a single user correspond to granting a multicast connection. It is also useful when applied to unicast connections if more than one output port is available to be speculatively scheduled and a subset of output ports contains likely candidates of output ports to be speculatively allocated to the same input port. To make it possible for the user to only use a subset of the connections of a speculatively set up multi-cast, the transferred data items may have destination identifications attached or incorporated. The destinations can use that information to filter the received data appropriately. Referring to FIG. 10, input port IP1 is granted a multicast connection to output ports OP1, OP3, and OP4. The transferred data includes information identifying the destination as output ports OP1 and OP3. Thus, output port OP4 filters out the received data on that basis. In that way a speculative multicast may be set up and the user can use a subset of the speculatively allocated resources. Note that the arbiter may be implemented in software, hardware or a combination of both. The particular implementation may vary according to the application in which the arbiter is being used and according to the algorithm(s) utilized by the arbiter in speculatively granting (and otherwise granting) resources.

Figure 11:
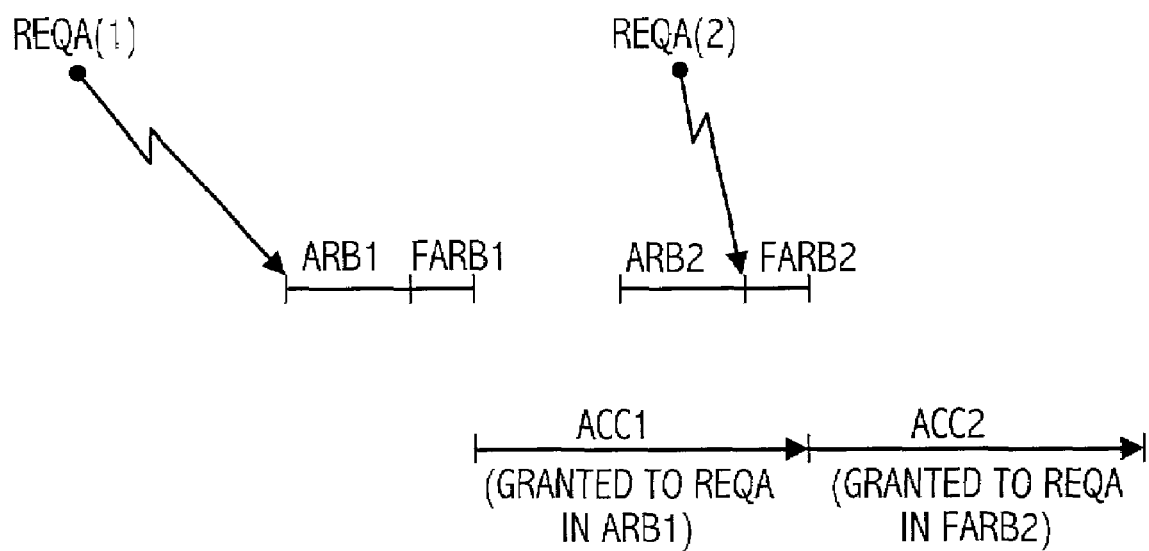
FIG. 11 shows an alternative in which a fast arbiter is used in conjunction with a regular arbiter to handle late arriving requests for resources.

Referring to FIG. 11, an alternative that may be used in place of or in addition to speculative arbitration is illustrated. The arbiter described in FIG. 11 considers "late requests." More specifically, once regular arbitration has taken place, late requests, that is requests received after the regular arbitration has started are considered by a "fast arbiter." The fast arbiter uses a less efficient (e.g., in terms of the number of granted requests) but faster algorithm than the regular arbiter. As shown in FIG. 11, while the request REQA(1) is considered by the regular arbiter during arbitration ARB1, REQA(2), which is received after the start of the regular arbitration cycle ARB2, is considered by the fast arbiter in the fast arbitration portion FARB2, of the arbitration cycle.

The description of the invention set forth herein is illustrative, and is not intended to limit the scope of the invention as set forth in the following claims. The various embodiments and arbitration approaches described above may be used in various combinations. While specific examples of switches and multiprocessor systems have been shown, the arbitration approach described herein is generally applicable to sharing of resources in a variety of systems including networks and communication systems where resources are shared. Other variations and modifications of the embodiments disclosed herein, may be made based on the description set forth herein, without departing from the scope of the invention as set forth in the following claims.

What is claimed is:

1. A method for sharing multiple resources among users using an arbiter comprising:
   receiving by the arbiter an indication from a first user as to whether the first user wishes to be speculatively allocated a first resource,
   allocating the first resource speculatively to the first user for use during an access interval, absent a request for the first resource from the first user, when the first user wishes to be speculatively allocated the first resource according to the indication,
   wherein speculatively allocating the first resource comprises allocating the first resource according to one of a fixed priority scheme and a scheme allocating the resource to a user with the fewest request.

2. The method as recited in claim 1 further comprising allocating at least a second resource for use during the access interval according to a request received by the arbiter for the second resource.

3. The method as recited in claim 1 wherein the arbiter receives an indication from at least one resource as to whether the at least one resource wishes to be speculatively allocated to a user.

4. The method as recited in claim 1 wherein real-time requests are speculatively allocated by the arbiter.

5. The method as recited in claim 1 further comprising speculatively allocating more than one resource, including the first resource, to the first user for use during the access interval.

6. The method as recited in claim 1 wherein the resources are storage locations and the users are processors.

7. The method as recited in claim 1 wherein the resources are communication links and the users are communicatively coupled to the communication links.

8. A method for sharing multiple resources among users using an arbiter comprising:
   allocating a first of the resources speculatively to a first of the users for use during an access interval, absent a request for the first resource from the first user,
   wherein the arbiter speculatively allocates the first resource to the first user according to the first user having requested the first resource during a previous arbitration cycle.

9. The method as recited in claim 8 wherein the arbiter speculatively allocates the first resource to the first user according to the first user being granted a request for use of one of the resources during a previous arbitration cycle.

10. The method as recited in claim 8 wherein when multiple requesters requested the first resource during the previous arbitration cycle, the arbiter speculatively allocates the first resource to the one of the users according to one of a round-robin scheme and a pseudo random scheme.

11. The method as recited in claim 8 wherein when multiple requesters requested the first resource during a predetermined number of previous arbitration cycles, the arbiter speculatively allocates the first resource according to which of the users had the most requests for the first resource, during the predetermined number of previous arbitration cycles, the predetermined number being one or more.

12. The method as recited in claim 8 wherein real-time requests are speculatively allocated by the arbiter.

13. The method as recited in claim 8 further comprising speculatively allocating more than one resource, including the first resource, to the first user for use during the access interval.

14. A method for sharing multiple resources among users using an arbiter comprising:
  allocating a first of the resources speculatively to a first of the users for use during an access interval, absent a request for the first resource from the first user,
  wherein speculatively allocating the first resource comprises allocating the first resource according to which of the users had the most requests for all resources combined, for a predetermined number of previous arbitration cycle.

15. A method for sharing multiple resources among users using an arbiter comprising:
  allocating a first of the resources speculatively to a first of the users for use during an access interval, absent a request for the first resource from the first user,
  wherein speculatively allocating the first resource comprises allocating the first resource according to which of the users had the most grants for a predetermined number of previous arbitration cycles.

16. The method as recited in claim 15 wherein speculatively allocating the first resource comprises allocating the first resource according to which of the users received the most grants for the first resource during a predetermined number of previous arbitration cycles.

17. A method for sharing multiple resources among users using an arbiter comprising:
  allocating a first of the resources speculatively to a first of the users for use during an access interval, absent a request for the first resource from the first user,
  wherein speculatively allocating the first resource comprises allocating the first resource according to a fill level of at least one of a send queue and a receive queue associated respectively with a user and resource for an arbitrated data transfer.

18. A method for sharing multiple resources among users using an arbiter comprising:
  allocating a first of the resources speculatively to a first of the users for use during an access interval, absent a request for the first resource from the first user,
  wherein a maximum number of resources unallocated by the arbiter for a particular access cycle are speculatively allocated for use during the particular access cycle.

19. An apparatus comprising:
  a plurality of users; and
  an arbiter coupled to receive request for use of resource by respective users and to receive an indication from a first use of the plurality of users as to whether the first user wishes to be speculatively allocated a resource,
  wherein the arbiter is responsive to speculatively allocate the resource to the first user for use during an access interval, absent a request from the first user the resource, when the first user wishes to be speculatively allocated the resource according to the indication.

20. The apparatus as recited in claim 19, wherein the arbiter further receives a specified set of one or more resources indicating which resources the first user is interested in being speculatively allocated.

21. The apparatus as recited in claim 19 wherein the arbiter allocates at least a second resource for use during the access interval according to a request received by the arbiter for the second resource.

22. The apparatus as recited in claim 19 wherein the arbiter speculatively allocates the resource to the first user according to the first user having been granted a request for the resource during a previous arbitration cycle.

23. The apparatus as recited in claim 19 wherein the arbiter speculatively allocates the resource to the first user according to the first user having requested the resource during a previous arbitration cycle.

24. The apparatus as recited in claim 23 wherein when multiple requesters requested the resource during the previous arbitration cycle, the arbiter is responsive to speculatively allocate the resource to the first user according to one of a round-robin scheme and a pseudo random scheme.

25. The apparatus as recited in claim 23 wherein when multiple requesters requested the resource during a predetermined number of previous arbitration cycles, the arbiter speculatively allocates the resource according to which of the users had the most requests for the resource, during the predetermined number of previous arbitration cycles, the predetermined number being one or more.

26. The apparatus as recited in claim 19 wherein speculatively allocating the resource comprises allocating the resource according to which of the users received the most grants or made the most requests, for a predetermined number of previous arbitration cycles.

27. The apparatus as recited in claim 19 wherein speculatively allocating the resource comprises allocating the resource according to a fixed priority scheme.

28. The apparatus as recited in claim 19 wherein a maximum number of resources unallocated by the arbitration logic for a particular access cycle in response to requests are speculatively allocated for use during the particular access cycle.

29. The apparatus as recited in claim 19 wherein the resources are memories and the users are processors.

30. An apparatus comprising:
  a plurality of users; and
  an arbiter coupled to receive requests for use of resources by respective users, the arbiter responsive to speculatively allocate a resource to a first user of the plurality of users for use during an access interval, absent a request from the first user for the resource,
  wherein speculatively allocating the resource comprises allocating the resource according to which of the users received the most grants for the resource or made the most requests for the resource, during a predetermined number of previous arbitration cycles.

31. An apparatus comprising:
  a plurality of users; and
  an arbiter coupled to receive requests for use of resources by respective users, the arbiter responsive to speculatively allocate a first resource to a first user of the plurality of users for use during an access interval, absent a request from the first user for the first resource, wherein the arbiter speculatively allocates more than one resource, including the first resource, to the first user for use during the access interval.

32. The apparatus as recited in claim 31 wherein the resources are communication links and the users are communicatively coupled to the communication links.

33. A method of allocating resources in a system comprising:

arbitrating during a first arbitration cycle, requests received prior to a beginning of the first arbitration cycle, the requests for utilization of a first of the resources during a particular usage interval; and allocating a second of the resources unallocated during the first arbitration cycle, prior to a start of the particular usage interval, wherein the second resource is allocated utilizing a second arbitration cycle, subsequent to the first arbitration cycle, the second arbitration cycle arbitrating those requests received after the start of the first arbitration cycle.

34. The method as recited in claim 33 wherein the second resource is allocated speculatively.

35. The method as recited in claim 33 wherein the second arbitration cycle is shorter than the first arbitration cycle.

36. The method as recited in claim 33 wherein real-time requests are speculatively allocated by the arbiter.

37. The method as recited in claim 33 further comprising speculatively allocating more than one resource, including the first resource, to a user for use during the particular usage interval.

38. An apparatus comprising:

an arbiter coupled to supply control information for use of resources, the arbiter coupled to receive requests from users for use of the resources during a particular access interval, the arbiter responsive to a first group of requests received prior to the start of a first arbitration cycle to determine allocation of the resources during the first arbitration cycle according to the first group of requests and to receive at least a second group of requests after the start of the first arbitration cycle, and to determine additional allocation of the resources according to the second group of requests during a second arbitration cycle, the second arbitration cycle being shorter than the first arbitration cycle, the first and second arbitration cycles allocating resources for use during the particular access interval.

39. The apparatus as recited in claim 38 wherein real-time requests are speculatively allocated by the arbiter.

40. The apparatus as recited in claim 38 wherein the arbiter speculatively allocates more than one resource, including the first resource, to a user for use during the particular access interval.

41. A method for sharing multiple resources among users using an arbiter comprising:

allocating a first of the resources speculatively to a first of the users for use during an access interval, absent a request for the first resource from the first of the users, wherein speculatively allocating the first resource comprises using a scheme allocating the first resource to a user with the fewest requests.

* * * * *

UNITED STATES PATENT AND TRADEMARK OFFICE
CERTIFICATE OF CORRECTION

PATENT NO. : 7,352,741 B2  
APPLICATION NO. : 10/080135  
DATED : April 1, 2008  
INVENTOR(S) : Hans Eberle et al.

Page 1 of 1

It is certified that error appears in the above-identified patent and that said Letters Patent is hereby corrected as shown below:

In Claim 19, Column 9 (line 66), replace "use" with --user--;

In Claim 19, Column 10 (line 3), insert --for-- after "user".

Signed and Sealed this

Twenty-fourth Day of June, 2008

JON W. DUDAS  
*Director of the United States Patent and Trademark Office*